(12) United States Patent
Atzinger et al.

(10) Patent No.: US 8,804,907 B2
(45) Date of Patent: Aug. 12, 2014

(54) METHOD FOR OBTAINING AN ITEM OF X-RAY-SPECTRUM INFORMATION ABOUT PIXELS IN A GRID PATTERN

(75) Inventors: Franz Atzinger, Nürnberg (DE); Gerhard Hahm, Erlangen (DE); Raphael Henrich, Neunkirchen am Brand (DE); Carsten Illenseer, Möhrendorf (DE); Christoph Jablonski, Berlin (DE); Bernhard Sandkamp, Erlangen (DE); Markus Schild, Herzogenaurach (DE); Michael Stark, Forchheim (DE); Fabian Wloka, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 306 days.

(21) Appl. No.: 13/435,118

(22) Filed: Mar. 30, 2012

(65) Prior Publication Data
US 2013/0003934 A1 Jan. 3, 2013

(30) Foreign Application Priority Data
Mar. 30, 2011 (DE) .......................... 10 2011 006 393

(51) Int. Cl.
*H05G 1/46* (2006.01)
(52) U.S. Cl.
CPC ...................... *H05G 1/46* (2013.01)
USPC .......................................................... 378/97
(58) Field of Classification Search
CPC ............ H05G 1/46; H05G 1/42; H05G 1/64; A61B 6/542
USPC .............................................. 378/19, 98.8, 97
See application file for complete search history.

(56) References Cited

U.S. PATENT DOCUMENTS

| 5,773,832 | A * | 6/1998 | Sayed et al. | 250/370.09 |
|---|---|---|---|---|
| 7,079,189 | B2 * | 7/2006 | Tsujii et al. | 348/372 |
| 7,403,589 | B1 | 7/2008 | Short et al. | 378/19 |
| 2005/0105687 | A1 | 5/2005 | Heismann et al. | 378/98.8 |
| 2006/0086913 | A1 | 4/2006 | Spahn | 250/580 |
| 2008/0260094 | A1 | 10/2008 | Carmi | 378/19 |
| 2011/0051901 | A1 * | 3/2011 | Michel et al. | 378/165 |

FOREIGN PATENT DOCUMENTS

| DE | 10212638 A1 | 10/2003 | G01T 1/29 |
|---|---|---|---|
| DE | 102004048962 A1 | 4/2006 | G03B 42/02 |
| DE | 102008016008 A1 | 10/2008 | A61B 6/03 |

OTHER PUBLICATIONS

German Office Action, German Patent Application No. 10 2011 006 393.5, 5 pages, Mar. 26, 2012.

* cited by examiner

*Primary Examiner* — Irakli Kiknadze
(74) *Attorney, Agent, or Firm* — King & Spalding L.L.P.

(57) ABSTRACT

An X-ray detector of conventional design having photodiodes and scintillator material arranged thereon is able, given a suitable read-out frequency matching a low dose to which the flat-panel X-ray detector is subjected, to obtain images during each read-out operation, from which images the energy of individual X-ray quanta can be derived. An item of X-ray-spectrum information about pixels in a grid pattern can be obtained thereby.

18 Claims, 2 Drawing Sheets

METHOD FOR OBTAINING AN ITEM OF X-RAY-SPECTRUM INFORMATION ABOUT PIXELS IN A GRID PATTERN

CROSS-REFERENCE TO RELATED APPLICATIONS

This application claims priority to DE Patent Application No. 10 2011 006 393.5 filed Mar. 30, 2011. The contents of which is incorporated herein by reference in its entirety.

TECHNICAL FIELD

This disclosure relates to a method for obtaining an item of spectrum information relating to X-rays about pixels in a grid pattern.

BACKGROUND

X-ray images in grid-pattern format are typically produced by using X-ray detectors that have a plurality of pixel elements. Each pixel element serves to obtain a relevant item of information which is assigned to the associated pixel in a grid pattern.

A single item of information, namely a gray-scale value, has hitherto be obtained that is a measure of the extent to which X-rays emanating from an X-ray source are attenuated by an object situated between the X-ray source and the X-ray detector's respective pixel element.

A widely employed X-ray detector includes photodiodes on which a scintillator material is arranged. A scintillator layer converts X-ray quanta into light quanta, specifically converting each X-ray quantum into a plurality of light quanta, with the total energy of the light quanta being in scale with the energy of the X-ray quanta. The photodiodes register the total energy of all light quanta impinging upon them. A corresponding measured value keeps increasing light quantum for light quantum. The sum (integral) of the light-quantum energies and hence of the X-ray-quantum energies is thus obtained as the measured value for each pixel element.

A body permeated by X-rays will attenuate X-ray quanta of different energies to a differing extent. Because an X-ray source usually has a broadband spectrum, an item of information about how individual frequency bands from the spectrum are attenuated would be desirable. Materials can be assigned to regions in the body being X-rayed once said information is available, for example it can be determined whether a region consists of bone material or metal, and different metals can be distinguished etc.

For recognizing different materials a plurality of images recorded with different X-ray spectra have been used hitherto in X-ray systems as employed, for example, for checks at airports.

A current development trend aims at constructing X-ray detectors in such a way as already to possess an energy-resolving capability. Relevant concepts to date are based on converters that convert the X-rays directly into electrons. Converters of such kind based on, for instance, cadmium telluride (CdTe) are difficult to produce, can be provided covering a small area only, and costly tiling appears necessary.

SUMMARY

In an embodiment, a method for obtaining an item of spectrum information relating to X-rays about pixels in a grid pattern comprises: providing an X-ray detector having a plurality of pixel elements to each of which a pixel in the grid pattern corresponds, with each pixel element having a photodiode for registering light quanta and with scintillator material being arranged over the photodiodes that converts X-ray quanta into light quanta for the photodiodes; establishing both a read-out frequency that can be realized because of the X-ray detector's structural design and with which the pixel elements will be read out and reset for an image recording, and a dose, assigned to an X-ray source, per image recording in such a way that at most only a predefined portion of the pixel elements will receive light quanta during image recording using the established dose and established read-out frequency; for a plurality of times, operating the X-ray source in such a way that it will emit only the established dose, reading out the pixel elements using the established read-out frequency for obtaining a respective total energy of the light quanta impinging upon the respective pixel element and at least for one X-ray quantum deriving the energy of the X-ray quantum for a respective pixel element from total energies of such kind in accordance with a predefined rule; and combining the thus obtained information about the energy of X-ray quanta that have been assigned to the pixel elements.

In a further embodiment, the predefined rule states that out of a group of adjacent pixel elements that receive light quanta in the case of one of the plurality of times, in each case one selected pixel element, in particular one having the highest total energy of received light quanta, will be assigned the energy of an X-ray quantum corresponding to the totality of light-quantum energies received by the group. In a further embodiment, the predefined portion is between $1/250$ and $1/15$, in particular between $1/100$ and $1/20$. In a further embodiment, the read-out frequency is established as being greater than 5,000 Hz and the dose as being less than 200 nGray.

BRIEF DESCRIPTION OF THE DRAWINGS

Example embodiments will be explained in more detail below with reference to figures, in which.

DETAILED DESCRIPTION

Figure 1:
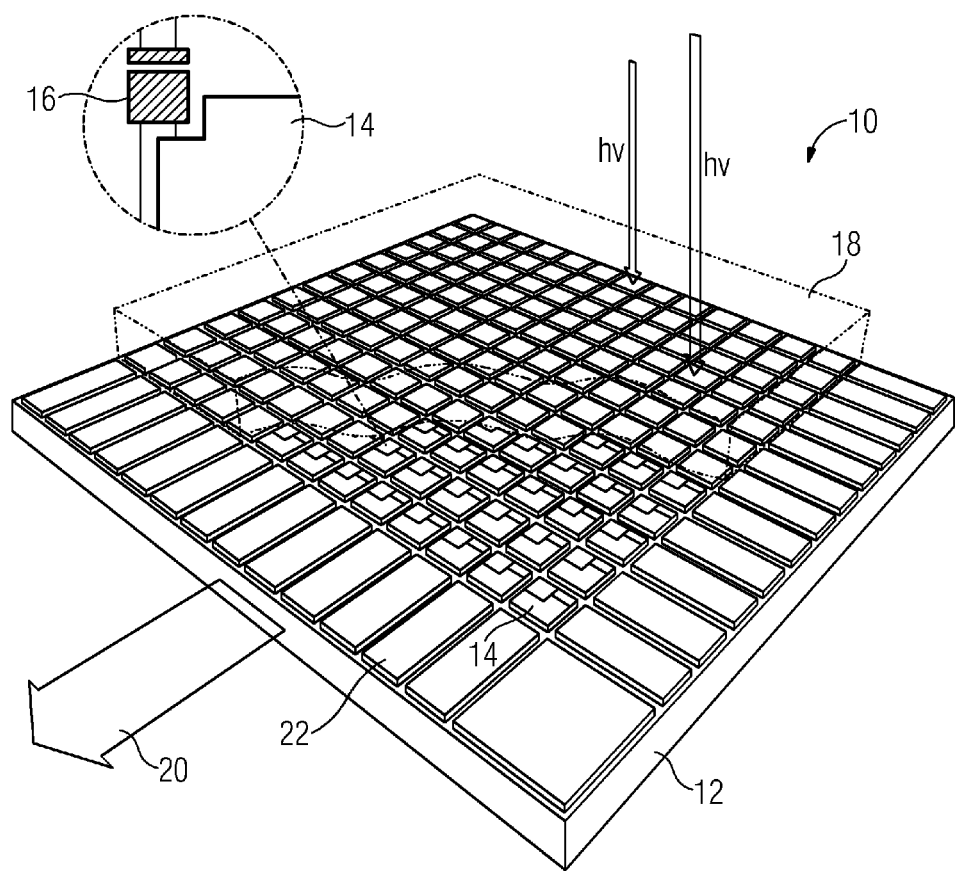
FIG. 1 illustrates a perspective view of an example flat-panel X-ray detector employed for realizing the method according to example embodiments.

Some embodiments provide a method for obtaining an item of spectrum information relating to X-rays about pixels in a grid pattern, which method can be implemented at relatively little cost but will nonetheless furnish a satisfactory item of spectrum information.

Some embodiments employ an X-ray detector having a plurality of pixel elements to each of which a pixel in the grid pattern corresponds, with each pixel element having a photodiode for registering light quanta and with scintillator material being arranged over the photodiodes that converts (is designed for converting) X-ray quanta into light quanta for the photodiodes. For example, a conventional type of X-ray detector may be used. A read-out frequency may then be established as disclosed herein, based on the X-ray detector's structural design. The pixel elements may be read out and reset at the read-out frequency, with each read-out and resetting operation corresponding to a pixel recording. A dose, assigned to an X-ray source, per image recording may furthermore be also established as disclosed herein. The read-out frequency and dose may be established in a coordinated—i.e., mutually accommodating—manner in such a way that at most only a predefined portion of the pixel elements will receive light quanta during image recording using the established dose and established read-out frequency. In particular low doses, as customary in fluoroscopy, and high read-out frequencies, as can be realized using CMOS-based high-speed flat-panel X-ray detectors, can be mutually combined in order to fulfill that condition. The X-ray source may now be operated a plurality of times in such a way as to emit the established dose and the pixel elements will then be read out with the read-out frequency. For each pixel element that receives light quanta, the total energy of the light quanta may then be registered in accordance with a predefined rule. An X-ray quantum's energy for a respective pixel element may then derived directly therefrom and the items of information thus obtained about the energy of X-ray quanta assigned to the pixel elements will be combined. The grid pattern may thus comprise multidimensional information, e.g., each pixel may be assigned an item of information about a spectrum, i.e., one attenuation coefficient for a plurality of energies.

Embodiments of the method disclosed herein may thus depart from using direct converters like cadmium telluride. Rather the method may be based on the knowledge that conventional high-speed flat-panel X-ray detectors in conjunction with conventional X-ray sources already make the method possible and that, given the expected increase in read-out frequency or, as the case may be, speed in the years to come, increasingly more precise measurements will become possible.

In some embodiments, the predefined rule according to which an X-ray quantum's energy for a respective pixel element may be derived from the total energy of light quanta states that out of a group of adjacent pixel elements that receive light quanta in the case of one of the plurality of times, in each case one selected pixel element (in particular a [or, as the case may be, the] pixel element having the highest total energy of the received light quanta, or a central pixel element that is surrounded by the other pixel elements) will be assigned the energy of an X-ray quantum corresponding to the totality of the light-quantum energy received by the group. That is based on the knowledge that owing to the scintillator's thickness not all the light quanta produced by an X-ray quantum will impinge upon the same photodiode but on mutually adjacent photodiodes.

The predefined portion may be between ⅟250 and ⅟15, in particular between ⅟100 and ½0. During each read-out operation (during each image recording), individual X-ray quanta can in that way be uniquely identified in their track created by the light quanta. What could otherwise happen is that two different X-ray quanta give rise to light quanta that impinge upon the same photodiode so that an adequately good assignment would then no longer be possible.

Average figures for the read-out frequency at which the method will function well include 5,000 Hz or more with a dose of 200 nGray, as is found in fluoroscopy.

Read-out frequencies of at least 5,000 Hz have already been realized for flat-panel X-ray detectors that are relatively small in area and a plurality of modules of such kind can be combined within the scope of a modular structure, for which purpose concepts in which a plurality of wafer layers lie one above the other already exist within the technical field.

Figure 2:
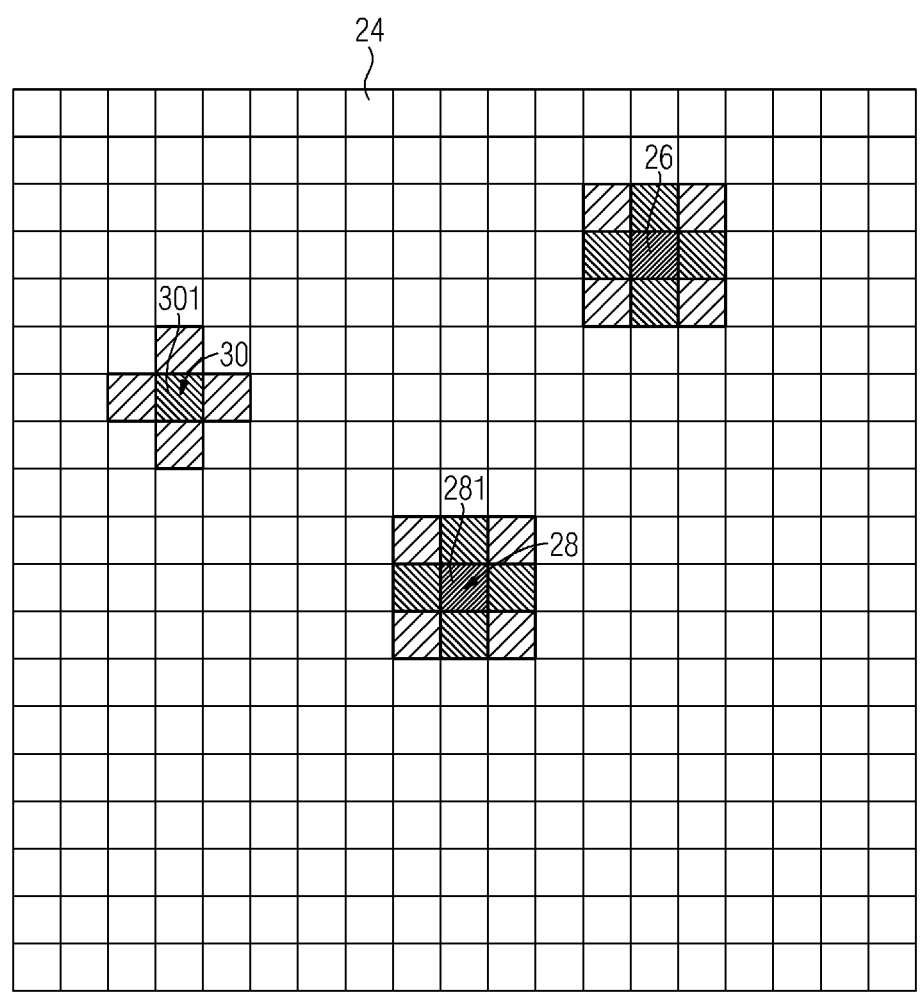
FIG. 2 illustrates example gray-scale values obtained during an individual image recording with a high read-out frequency and low X-ray dose that form the basis for assigning X-ray-quantum energies.

Referring to FIG. 1, an X-ray detector identified in its entirety by 10 includes a support 12 on which photodiodes 14 and their associated electronic components 16 (including a switch) are arranged. Located over photodiodes 14 is a scintillator layer 18. X-ray quanta hv impinge upon scintillator layer 18, which converts the X-ray quanta into light quanta whose total energy is in scale with the energy of the respective X-ray quanta. Said light quanta impinge upon photodiodes 14 and a corresponding measuring signal increases in a manner known per se with the energy of the light quanta that have impinged. The measuring signal is then read out at a certain read-out cadence and in each case reset to zero, which is symbolized in the figure by arrow 20 on electronic read-out elements 22. It is here assumed that an X-ray detector 10 of the kind shown in FIG. 1 is known per se. What is intended to be used is an X-ray detector 10 that makes a particularly high read-out frequency possible of at least 5,000 Hz, preferably up to 10,000 Hz or more. A novel kind of operating mode applies in the present case: the X-ray dose is selected as especially low while the read-out frequency is selected as especially high. An X-ray image such as X-ray image 24 shown in FIG. 2 can then be realized during a read-out operation. Light quanta have here impinged only upon ⅟15 of individual photodiodes 14.

An analogous condition can be determined for the read-out frequency and dose. For example, assume 30 light quanta per square millimeter of the detector area and per nGray dose. With photodiodes 14 measuring 150 μm times 150 μm, that corresponds to approximately one quantum per pixel element and per nGray. If it should then happen that significantly fewer pixel elements, for example only ⅟100 of the total number, have been impinged upon in a read-out cycle than the X-ray detector has pixel elements, then the numerical value of the frequency is the reciprocal of that portion multiplied by the numerical value for the dose in nGray. Thus if the portion is ⅟100 then a factor of 100 is obtained for the dose, so if the dose for fluoroscopy is 100 nGray then a read-out frequency of 10,000 Hz will be needed in the case of a pixel-element size of 150 μm and 30 X-ray quanta per square millimeter and nGray.

A read-out frequency of such kind is possible; if it is desired to construct X-ray detector 10 as covering a large area then it may be of modular design and a separate wafer layer may be provided for the electronic components.

If an X-ray image such as X-ray image 24 is now obtained during a read-out operation, then individual X-ray quanta can be recognized from their track. Thus, for example, X-ray image 24 shows three X-ray quanta corresponding to pixel groups 26, 28, and 30, with each group corresponding to a plurality of pixels to which different gray-scale values have been assigned. Each X-ray quantum can hence be assigned a value for the X-ray-quantum energy: if the total energy of the light quanta in a group is known, then said X-ray-quantum energy can be derived directly. For example, the gray-scale values are much higher in group 28 than in group 30, indicating that the energy of the X-ray quantum belonging to group 28 is much greater than in group 30. Said energy can be quantified and for example assigned to middle pixel 281 or 301.

If the recording of images such as X-ray image 24 is then repeated a large number of times, for example 10,000 times, information will be obtained about a very large number of X-ray quanta, e.g., with reference to each pixel element and each photodiode 14. If the spectrum of an X-ray source which emits the X-rays impinging X-ray quantum by X-ray quantum upon photo detector 10 is known, an item of spectrum information can then be provided for each pixel. For example the energy range can be divided into a plurality of intervals and it can be indicated for each interval and pixel how many X-ray quanta having an energy from said interval have been assigned to said pixel. Pixel-by-pixel attenuation information covering an entire spectrum can thus be gathered and a specific material can be assigned to each pixel. Thus, if X-ray detector 10 having an X-ray source is used for imaging an image object employing the method described herein, materials can be assigned to individual regions of the image object that correspond to individual pixels of the grid-pattern image having the spectrum information. For example, an object including a plurality of metals can be analyzed to establish which metals are situated at which location. In the case of a biological object it is possible, for example, to distinguish between different types of tissue.

What is claimed is:

1. A method for obtaining an item of spectrum information relating to X-rays about pixels in a grid pattern, comprising:
    providing an X-ray detector having a plurality of pixel elements each corresponding to a pixel in the grid pattern, each pixel element including a photodiode for registering light quanta, and wherein a scintillator material that converts X-ray quanta into light quanta for the photodiodes is arranged over the photodiodes;
    establishing both a read-out frequency that can be realized because of the X-ray detector's structural design and with which the pixel elements will be read out and reset for an image recording, and a dose, assigned to an X-ray source, per image recording in such a way that at most only a predefined portion of the pixel elements will receive light quanta during image recording using the established dose and established read-out frequency;
    for a plurality of times, operating the X-ray source in such a way that it will emit only the established dose, reading out the pixel elements using the established read-out frequency for obtaining a respective total energy of the light quanta impinging upon the respective pixel element and at least for one X-ray quantum deriving the energy of the X-ray quantum for a respective pixel element from total energies of such kind in accordance with a predefined rule; and
    combining the thus obtained information about the energy of X-ray quanta that have been assigned to the pixel elements.

2. The method of claim 1, wherein the predefined rule states that for a group of adjacent pixel elements that receive light quanta at one of the plurality of times, one selected pixel element is assigned the energy of an X-ray quantum corresponding to the totality of light-quantum energies received by the group.

3. The method of claim 2, wherein the predefined rule states that the selected pixel element is the pixel element having the highest total energy of received light quanta.

4. The method of claim 1, wherein the predefined portion is between $\frac{1}{250}$ and $\frac{1}{15}$.

5. The method of claim 3, wherein the predefined portion is between $\frac{1}{100}$ and $\frac{1}{20}$.

6. The method of claim 1, wherein the read-out frequency is established as being greater than 5,000 Hz and the dose as being less than 200 nGray.

7. The method of claim 6, wherein the read-out frequency is established as being greater than 10,000 Hz and the dose as being less than 200 nGray.

8. A method for obtaining information relating to X-ray quanta in an X-ray system including an X-ray source and an X-ray detector having an array of pixel elements, each having a photodiode for registering light quanta, and a scintillator arranged over the array of photodiodes, comprising:
    selecting a low X-ray dose for the X-ray source such that for each instance of operating the X-ray source, only a fraction of the individual photodiodes are impinged by light quanta from the X-ray source,
    determining the fraction of impinged photodiodes from a read-out of the X-ray detector, and
    determining a read-out frequency for the X-ray detector based on the selected X-ray dose multiplied by the fraction of impinged photodiodes determined from the read-out of the X-ray detector; and
    operating the X-ray detector according to the determined read-out frequency.

9. The method of claim 8, wherein the fraction of impinged photodiodes is between $\frac{1}{250}$ and $\frac{1}{15}$.

10. The method of claim 8, wherein the fraction of impinged photodiodes is between $\frac{1}{100}$ and $\frac{1}{20}$.

11. The method of claim 8, wherein the selected X-ray dose is less than 200 nGray, and the determined read-out frequency is greater than 5,000 Hz.

12. The method of claim 8, wherein the selected X-ray dose is less than 200 nGray, and the determined read-out frequency is greater than 10,000 Hz.

13. A method for obtaining information relating to X-ray quanta in an X-ray system including an X-ray source and an X-ray detector having an array of pixel elements, each having a photodiode for registering light quanta, and a scintillator arranged over the array of photodiodes, comprising:
    selecting a low X-ray dose for the X-ray source such that for each instance of operating the X-ray source, only a fraction of the individual photodiodes are impinged by light quanta from the X-ray source,
    selecting a read-out frequency for the X-ray detector; and
    operating the X-ray source and X-ray detector according to the selected dose and read-out frequency,
    for a plurality of times, operating the X-ray source according to the selected dose and reading out the pixel elements using the selected read-out frequency to obtain a respective total energy of the light quanta impinging upon individual pixel elements and, for at least one X-ray quantum, deriving the energy of the X-ray quantum for a respective pixel element from total energies in accordance with a predefined rule; and
    combining the obtained information about the energy of X-ray quanta assigned to the pixel elements.

14. The method of claim 13, wherein the fraction of impinged photodiodes is between $\frac{1}{250}$ and $\frac{1}{15}$.

15. The method of claim 13, wherein the fraction of impinged photodiodes is between $\frac{1}{100}$ and $\frac{1}{20}$.

16. The method of claim 13, wherein the selected X-ray dose is less than 200 nGray, and the determined read-out frequency is greater than 5,000 Hz.

17. The method of claim 13, wherein the selected X-ray dose is less than 200 nGray, and the determined read-out frequency is greater than 10,000 Hz.

18. The method of claim 13, wherein the predefined rule states that for a group of adjacent pixel elements that receive light quanta at one of the plurality of times, the pixel element having the highest total energy of received light quanta is assigned the energy of an X-ray quantum corresponding to the totality of light-quantum energies received by the group.

* * * * *